United States Patent
Liu

(10) Patent No.: US 9,392,222 B2
(45) Date of Patent: Jul. 12, 2016

(54) VIDEO PRESENCE METHOD AND SYSTEM

(71) Applicant: Huawei Technologies Co., Ltd., Shenzhen (CN)

(72) Inventor: Yuan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/200,196

(22) Filed: Mar. 7, 2014

(65) Prior Publication Data

US 2014/0184730 A1    Jul. 3, 2014

Related U.S. Application Data

(63) Continuation of application No. PCT/CN2012/075544, filed on May 16, 2012.

(30) Foreign Application Priority Data

Oct. 28, 2011    (CN) .......................... 2011 1 0334678

(51) Int. Cl.
*H04N 7/15*    (2006.01)
*H04N 13/00*    (2006.01)
*H04N 13/04*    (2006.01)

(52) U.S. Cl.
CPC .............. *H04N 7/15* (2013.01); *H04N 13/0029* (2013.01); *H04N 13/0066* (2013.01); *H04N 13/0447* (2013.01); *H04N 13/0497* (2013.01); *H04N 13/0404* (2013.01); *H04N 13/047* (2013.01); *H04N 13/0409* (2013.01); *H04N 13/0452* (2013.01)

(58) Field of Classification Search
USPC ......................................................... 348/14.07
See application file for complete search history.

(56) References Cited

U.S. PATENT DOCUMENTS

| 5,703,961 A | * 12/1997 | Rogina et al. ................. 382/154 |
| 6,603,504 B1 | 8/2003 | Son et al. |
| 2002/0030675 A1 | 3/2002 | Kawai |
| 2008/0068329 A1 | 3/2008 | Shestak et al. |

(Continued)

FOREIGN PATENT DOCUMENTS

| CN | 101291415 A | 10/2008 |
| CN | 101394572 A | 3/2009 |

(Continued)

OTHER PUBLICATIONS

Foreign Communication From a Counterpart Application, European Application No. 12844506.1, Extended European Search Report dated Jul. 16, 2014, 8 pages.

(Continued)

*Primary Examiner* — Creighton Smith
(74) *Attorney, Agent, or Firm* — Conley Rose, P.C.; Grant Rodolph

(57) ABSTRACT

A video presence method and system. The method includes: receiving a multi-viewpoint three-dimensional video signal from a remote end; determining multiple viewpoint image streams in the multi-viewpoint three-dimensional video signal; and alternately displaying the multiple viewpoint image streams in sequence in a viewing area, where a distance between two neighboring viewpoints in the multiple viewpoint image streams displayed in the viewing area is a pupillary distance. By adopting the present invention, remote three-dimensional video presence may be implemented.

14 Claims, 12 Drawing Sheets

(56) References Cited

U.S. PATENT DOCUMENTS

| | | |
|---|---|---|
| 2009/0079733 A1 | 3/2009 | Fukushima et al. |
| 2010/0165966 A1* | 7/2010 | Petion et al. .................. 370/338 |
| 2010/0238264 A1* | 9/2010 | Liu ...................... G06T 7/0065 348/14.13 |
| 2010/0271461 A1 | 10/2010 | Takizuka et al. |
| 2010/0315492 A1 | 12/2010 | Baik et al. |
| 2011/0069139 A1 | 3/2011 | Liu |
| 2013/0021429 A1* | 1/2013 | Liu ........................ H04N 7/147 348/14.07 |
| 2014/0270486 A1* | 9/2014 | Atzpadin et al. .............. 382/154 |
| 2015/0163476 A1* | 6/2015 | Grafulla-Gonzalez et al. .................. H04H 13/0029 |

FOREIGN PATENT DOCUMENTS

| | | |
|---|---|---|
| CN | 101518095 A | 8/2009 |
| CN | 101651841 A | 2/2010 |
| EP | 1734766 A2 | 12/2006 |

OTHER PUBLICATIONS

Foreign Communication From a Counterpart Application, PCT Application No. PCT/CN2012/075544, English Translation of Chinese Search Report dated Aug. 9, 2012, 2 pages.

Foreign Communication From a Counterpart Application, PCT Application No. PCT/CN2012/075544, English Translation of Chinese Written Opinion dated Aug. 9, 2012, 12 pages.

Dodgson, N., et al., "Analysis of the Viewing Zone of Multi-View Autostereoscopic Displays," University of Cambridge Computer Laboratory, Jan. 21-23, 2002, 12 pages.

Partial English Translation and Abstract of Chinese Patent Application No. CN101651841A, Dec. 11, 2013, 30 pages.

* cited by examiner

US 9,392,222 B2

VIDEO PRESENCE METHOD AND SYSTEM

CROSS-REFERENCE TO RELATED APPLICATIONS

This application is a continuation of International Application No. PCT/CN2012/075544, filed on May 16, 2012, which claims priority to Chinese Patent Application No. 201110334678.X, filed on Oct. 28, 2011, both of which are hereby incorporated by reference in their entireties.

TECHNICAL FIELD

The present invention relates to the field of telepresence technologies, and in particular, to a video presence method and system.

BACKGROUND

A telepresence system (Telepresence) may create an immersive virtual conference environment. The virtual conference environment fully embodies humanized elements of a participant, and copies a true experience of the participant as much as possible, which can greatly improve acceptability of an end user, thereby improving a utilization rate, and improving requirements, a rate of return on investment, and user satisfaction.

Compared with a conventional video conference system, the telepresence system has many advantages, including: providing an image of a true person size, an eye contact effect, a more affluent motion, and a precise physical behavior of a remote conference participant; a high-definition, studio-level video, illumination and audio effect; a uniform conference environment, which make participants feel that they are located at a same conference site, thereby ensuring experience consistency of different conference sites; and hide conference devices such as a video camera, thereby reducing affects on users.

Currently, the telepresence system adopts a two-dimensional video technology. One end of the telepresence system may include multiple displaying screens, sound/image capturing devices, and a communication device, and the like. However, the two-dimensional video technology uses two-dimensional information as a carrier form, which is incomplete because only content of scenery is represented but depth information, such as a distance and a position of an object, is neglected.

SUMMARY

A technical problem to be solved by embodiments of the present invention is to provide a video presence method and system, which may implement a three-dimensional video telepresence system, and improve an emulation degree of the telepresence system.

Accordingly, an embodiment of the present invention provides a video presence method, including: receiving a multi-viewpoint three-dimensional video signal from a remote end; determining multiple viewpoint image streams in the multi-viewpoint three-dimensional video signal; and alternately displaying the multiple viewpoint image streams in sequence in a viewing area, where a distance between two neighboring viewpoints in the multiple viewpoint image streams displayed in the viewing area is a pupillary distance.

In addition, a video presence system is provided that includes: a receiving module configured to receive a multi-viewpoint three-dimensional video signal from a remote end; a identifying module configured to identify multiple viewpoint image streams in the multi-viewpoint three-dimensional video signal; and a displaying module configured to alternately display the multiple viewpoint image streams in sequence in a viewing area, where a distance between two neighboring viewpoints in the multiple viewpoint image streams displayed in the viewing area is a pupillary distance.

In the video presence system of the embodiments of the present invention, a three-dimensional video technology is adopted, a multi-viewpoint three-dimensional video signal adapted to a telepresence system is selected according to a characteristic of the three-dimensional video signal, and the three-dimensional video signal is displayed according to a viewing area, which ensures that a viewer using the system may effectively view a video with a three-dimensional effect, and implements, in an extremely practical manner, a remote three-dimensional video presence system.

BRIEF DESCRIPTION OF DRAWINGS

To describe the technical solutions according to the embodiments of the present invention or in the prior art more clearly, accompanying drawings required for describing the embodiments or the prior art are introduced briefly in the following. The accompanying drawings in the following description merely show some embodiments of the present invention, and a person of ordinary skill in the art may further obtain other drawings according to these accompanying drawings without creative efforts.

DESCRIPTION OF EMBODIMENTS

Figure 1:
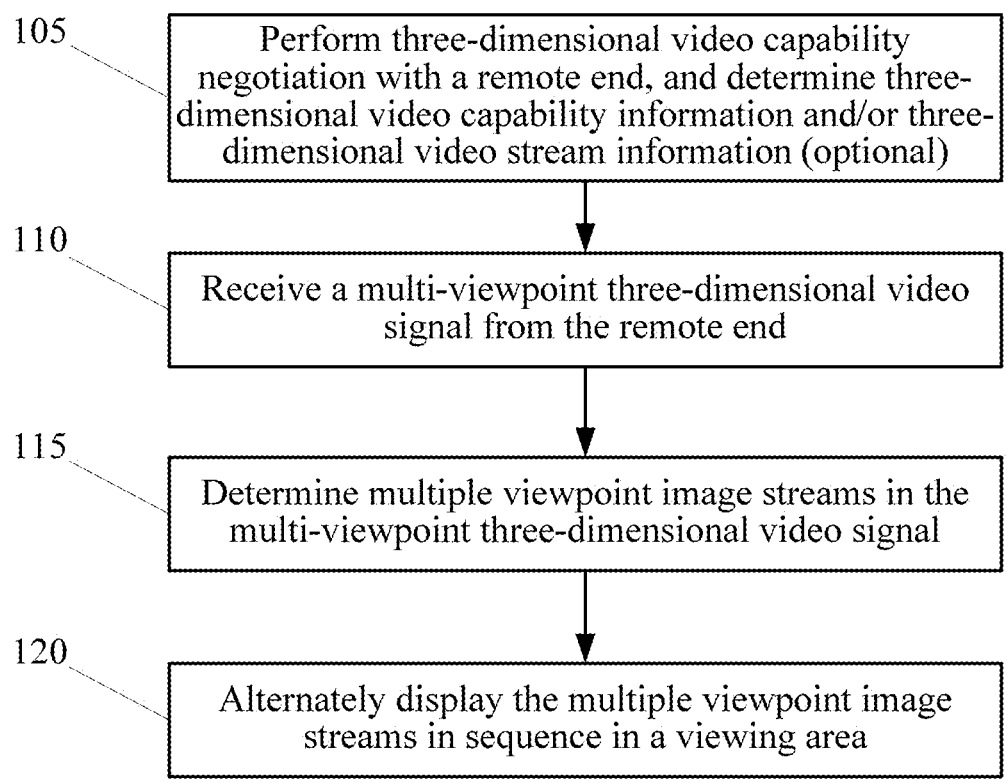
FIG. 1 is a specific schematic flowchart of a video presence method according to an embodiment of the present invention.

The technical solutions of the embodiments of the present invention are clearly described in the following with reference to the accompanying drawings in the embodiments of the present invention. The embodiments to be described are only a part rather than all of the embodiments of the present invention. All other embodiments obtained by a person of ordinary skill in the art based on the embodiments of the present invention without creative efforts shall fall within the protection scope of the present invention.

In the embodiments of the present invention, a multi-viewpoint naked eye three-dimensional (3D) technology is adopted. Multi-viewpoint naked eye 3D displaying is a relatively ideal 3D presence manner. A user may view a 3D image at multiple viewing positions within a relatively large range, where a 3D image view angle at each position is different from each other. However, a viewing effect of a multi-viewpoint naked eye display is closely relevant to a viewing distance and viewing view angle range of a viewer, and therefore, a displaying effect of the multi-viewpoint naked eye 3D display needs to be optimized for a telepresence scenario to obtain optimum 3D video experience.

The multi-viewpoint naked eye 3D technology in the embodiments of the present invention mainly includes a technology based on parallax barriers, a technology based on lenticular lenslets, and a Fresnel lens+time-multiplexed technology.

For example, in the multi-viewpoint naked eye 3D technology based on the parallax barriers, a fence-like barrier is placed in front of or behind a liquid crystal display screen. Due to a shielding effect of the barrier, a left eye or a right eye of an observer can only see, through a slit in the barrier, an odd or even column of pixels on the display screen, but cannot see all columns of pixels. In this way, two images respectively formed by the odd and even columns of pixels become a 3D image pair with a horizontal parallax, and through a visual function of the brain, are finally combined to form a 3D image delivering depth perception.

A principle of the multi-viewpoint naked eye 3D technology based on the lenticular lenslets is similar to that of the technology based on the parallax barriers, where a refraction principle of a cylindrical lens unit is used to guide light rays into a specific observation area, thereby generating a stereo image pair corresponding to the left and right eyes, and finally bringing out a stereo vision through amalgamation by the brain. The lenticular lenslets are of a transmission type. Therefore, a greatest advantage of a free stereo display produced by using this technology is that a displayed picture is not shielded, so that displaying brightness is not affected, and a stereo displaying effect is good. To solve a problem of two-dimensional (2D)/3D displaying switch, a technology of adjusting an optical grating parameter may be adopted by adding a liquid crystal module to a cylindrical lens array. Under a 2D mode, an appropriate voltage may be applied to make refractive indexes of a liquid crystal and the lens be consistent. The light rays passing through a lens layer are not refracted. Under a 3D displaying mode, no voltage is applied, so that the liquid crystal and the lens have different refractive indexes, the light rays are refracted when passing through the lens layer, so that 3D displaying can be performed.

In the Fresnel lens+time-multiplexed technology, a multi-viewpoint 3D image is obtained in a manner of improving a time domain frame rate. In this solution, a high-speed cathode ray tube (CRT) display, a projection lens, a liquid crystal shutter, a Fresnel lens, and the like are included. The high-speed CRT and an optical system make a 2D image form in one part of a multi-viewpoint observation area at each time point. When images at multiple viewpoints are formed at a sufficiently high speed, it seems that the observer can see the multiple images at the same time. For example, imaging of each viewpoint requires 60 hertz (Hz), and there are totally 8 viewpoints, so the CRT requires a minimum of 480 Hz to enable the observer to see flicker-free images of the 8 viewpoints.

After understanding the foregoing principle of the multi-viewpoint naked eye 3D displaying technology, it may be easier to understand a principle of a video presence method in the embodiments of the present invention: Multiple viewpoint image streams are obtained according to a characteristic of a viewing area, and when the image streams are displayed in the viewing area, if the left eye of a person receives a viewpoint image stream and the right eye receives another neighboring viewpoint image stream (vice versa), a 3D visual effect may be formed.

As shown in FIG. 1, FIG. 1 is a specific schematic flowchart of a video presence method according to an embodiment of the present invention. The method includes the following steps.

110: Receive a multi-viewpoint three-dimensional video signal from a remote end. If a system where the method is applied includes multiple 3D camera devices and multiple 3D displaying devices, the signal received herein may be multiple multi-viewpoint three-dimensional video signals from a remote end, and different 3D video content may be presented according to these signals.

115: Determine multiple viewpoint image streams in the multi-viewpoint three-dimensional video signal. In a multi-viewpoint 3D technology, a viewing effect is determined by a width of a 3D display screen, a width of a viewing range, the number of viewpoints, and an optimum viewing distance. Therefore, when a display is set to display a 3D video, viewing area information may be obtained first, and then the multiple viewpoint image streams in the multi-viewpoint three-dimensional video signal are determined according to the viewing area information.

120: Alternately display the multiple viewpoint image streams in sequence in a viewing area, where a distance between two neighboring viewpoints in the multiple viewpoint image streams displayed in the viewing area is a pupillary distance.

The embodiment may further include a negotiation procedure, that is, include step 105: Perform three-dimensional video capability negotiation with the remote end, and determine three-dimensional video capability information and/or three-dimensional video stream information to receive the multi-viewpoint three-dimensional video signal from the remote end according to the determined three-dimensional video capability information and/or three-dimensional video stream information.

Figure 2:
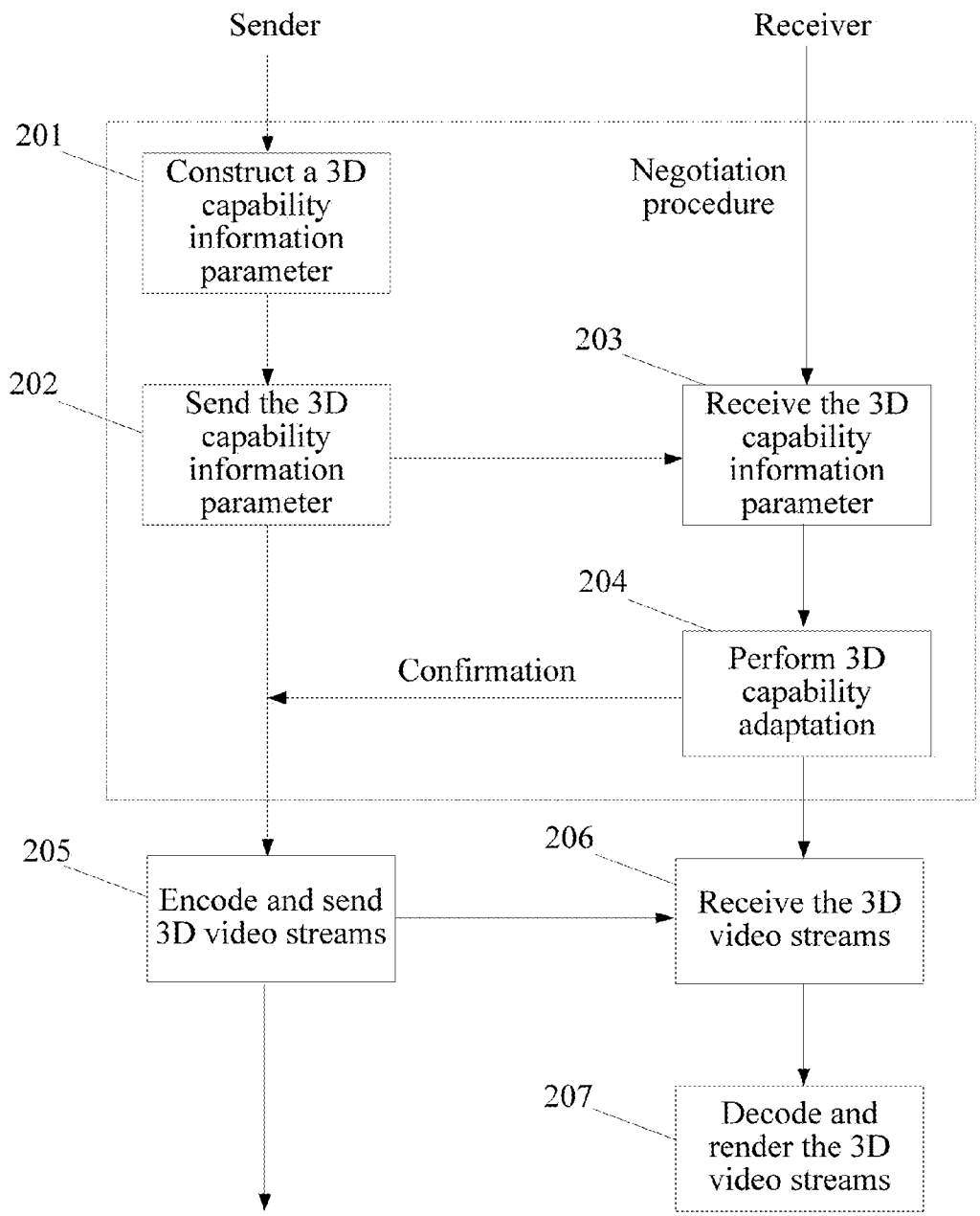
FIG. 2 is a specific schematic flowchart of performing video capability negotiation according to an embodiment of the present invention.
Figure 3:
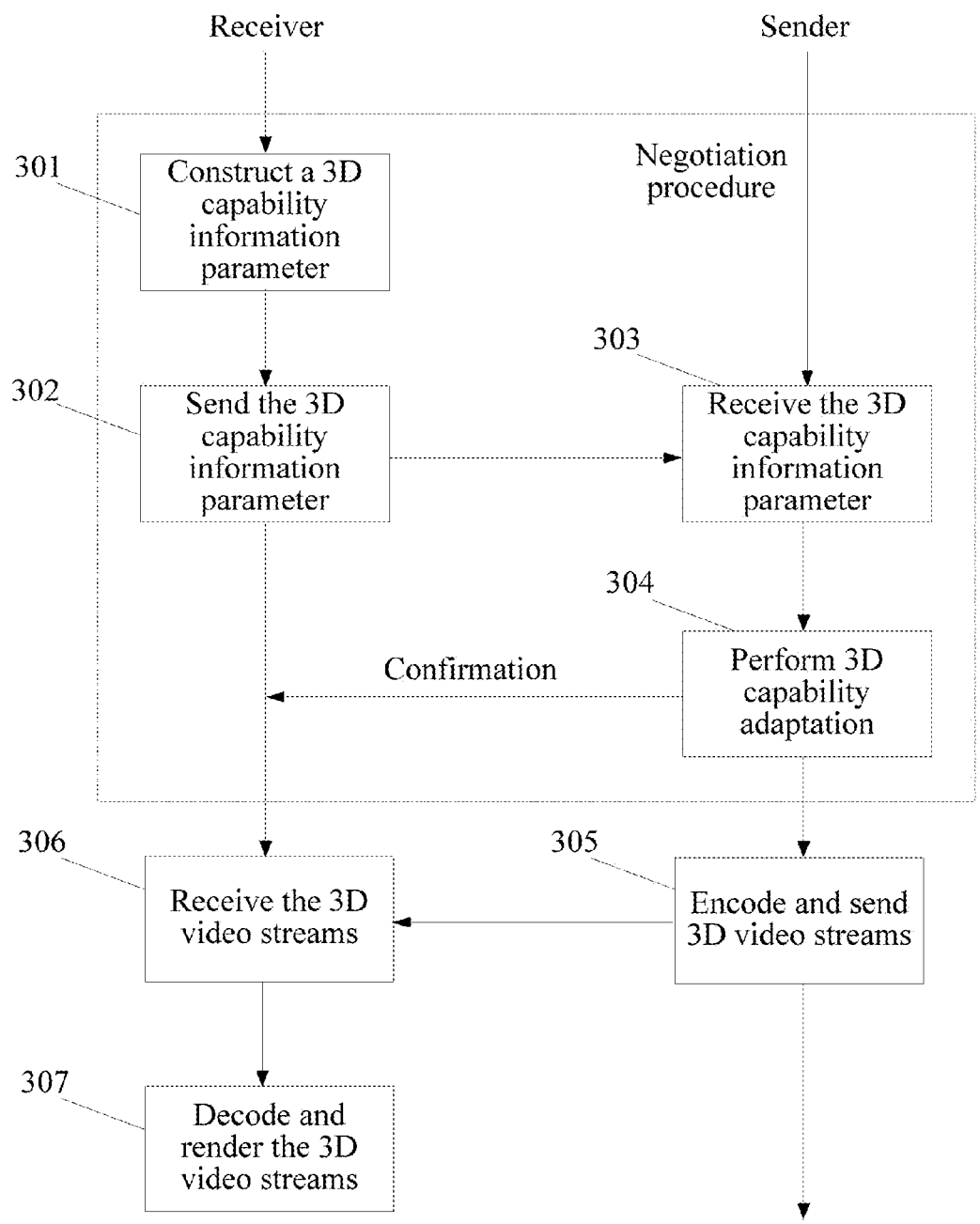
FIG. 3 is another specific schematic flowchart of performing video capability negotiation according to an embodiment of the present invention.

In a specific negotiation procedure, there may be two different manners, for example, receiving three-dimensional video capability information sent by the remote end; and performing three-dimensional video capability adaptation according to the three-dimensional video capability information to obtain locally supported three-dimensional video capability information; or, constructing three-dimensional video capability information; and sending the three-dimensional video capability information to the remote end, so that the remote end performs three-dimensional video capability adaptation, and then sends a three-dimensional video signal according to the three-dimensional video capability information. As shown in FIG. 2 and FIG. 3, the specific negotiation procedures in the two manners are respectively shown.

As shown in FIG. 2, a negotiation procedure in this embodiment includes the following steps.

201: A sender first constructs a 3D video capability information parameter according to a 3D video capability (or 3D capability for short) of the sender. For example, the 3D video capability information parameter may include a 3D video capturing end parameter and a 3D video displaying end parameter. The 3D video displaying end parameter includes one or more of the number of 3D video displaying devices, a 3D video displaying device type, the number of viewpoints, an ideal viewing distance, and a maximum displaying parallax. The 3D video capturing end parameter includes one or more of the number of 3D video capturing devices, a 3D video capturing device type, and a 3D video capturing device spatial position relationship. It should be noted that a 3D camera may be a camera that actually exists in telepresence, and may also be a virtual camera that does not actually exist, for example, may be a virtual viewpoint camera which is of a 3D video and is obtained by a computer through rendering.

The 3D video capability information may be described through multiple formats, for example, described by adopting an ASN.1 abstract syntax notation (Abstract Syntax Notation One), or described by adopting an extensible markup language (XML) language, or described by adopting a simple text format.

202: The sender sends the 3D video capability information parameter to a receiver through a signaling message.

203: The receiver receives the 3D video capability information parameter.

204: After receiving the 3D video capability information parameter, the receiver performs adaptation according to a 3D video capability of the receiver, for example, according to a 3D video rendering capability of the receiver, determines whether to receive video streams and which video streams to receive, or determines how to render 3D video streams, and seeks confirmation from the sender.

205: After the adaptation according to the 3D video capability, the sender sends the 3D video streams.

206: The receiver receives, according to a situation of the adaptation, the 3D video streams sent by a sending end.

207: The receiver decodes and renders the 3D video streams for displaying.

As shown in FIG. 3, the negotiation mode includes the following steps.

301: A receiver first constructs an information parameter according to a 3D capability of the receiver. For example, the foregoing described 3D video capturing end parameter and 3D video displaying end parameter of the receiver are described by adopting an ASN.1, or described by adopting an XML, or described by adopting a simple text format. For example, in this embodiment of the present invention, 3D capability information captured by a camera may be described by adopting a simple set of multiple attributes, and the multiple attributes are differentiated from each other by a space. 3D capability information in the following Table 1 to Table 5 is formed.

For example, in this embodiment of the present invention, the 3D capability information captured by the camera may be described by adopting the simple set of multiple attributes in the following, and the multiple attributes are differentiated from each other by the space, as shown in Table 1.

TABLE 1

IDENTITY TYPE POSITION RESOLUTION FRAMERATE . . .

IDENTITY: camera identifier
TYPE: camera type, which may be a camera (video) outputting a video image, and may also be a camera outputting a depth image (depth).
POSITION: position information, which describes a position relationship of a camera. There are multiple manners for describing the position information, where one manner is to define a certain position as an origin whose position coordinate is XYZ, and then use a rotation matrix and a translation vector for representation. The rotation matrix R is a 3 × 3 matrix, and the translation vector is a 3 × 1 column vector. Another manner is to adopt a predefined position relationship, for example, a manner of left, middle, and right, or an identifier indicating a position, for example, P0, P1 . . .
RESOLUTION: resolution
FRAMERATE: frame rate
Other attributes . . .

3D capability information of a video displaying end (or called a rendering end) may be described by adopting a manner shown in Table 2.

TABLE 2

IDENTITY TYPE POSITION SIZE RESOLUTION FRAMERATE VIEWPOINTS DISTANCE WIDTH PARALLAX . . .

IDENTITY: display identifier
TYPE: displaying device type, which may be one of the following displaying device types: a 2D display (2d), 3D display requiring glasses (including a red-blue-glass red-blue-glass, polarize-glass polarize-glass, time-multiplexing-glass time-multiplexing-glass, and the like), an autostereoscopic display (autostereoscopic), a multiview display (multiview), and the like.
POSITION: displaying device position information, where a format is consistent with position information of a camera.
SIZE: display size
RESOLUTION: display resolution
FRAMERATE: frame rate
VIEWPOINTS: the number of viewpoints
DISTANCE: viewing distance
WIDTH: viewing range
PARALLAX: maximum parallax
Other attributes . . .

The following further describes 3D video capability information in another embodiment of the present invention. In this embodiment, two 2D cameras C0 (a left camera) and C1 (a right camera) are adopted to form a binocular stereo camera for 3D video capturing, and a 24 inch single-viewpoint autostereoscopic display is used for video playback. A position of the display is in the middle, an optimum viewing distance is 1.5 meters (m), a visual range is 30 centimeters (cm), and a maximum parallax is 30 pixels. Then, the 3D video capability information in this embodiment is described in a form shown in Table 3.

TABLE 3

C0 video left 1920,1080 60
C1 video right 1920,1080 60
D0 autostereoscopic center 24 1920,1080 60 1 1.5 30 30

In another embodiment of the present invention, a 2D camera and a depth camera are adopted for 3D video capturing, and a 24 inch single-viewpoint autostereoscopic display is used for video playback. A position relationship between the camera and the display is described through a rotation matrix and a translation vector, and then the 3D video capability information in this embodiment is shown in Table 4.

TABLE 4

C0 video [1.0, 0.0, 0.0, 0.0, 1.0, 0.0, 0.0, 0.0, 1.0] [0.0, 0.0, 0.0]
1920,1080 60
C1 depth [−0.056728, −0.996211, −0.065927, −0.969795, 0.070673, −0.233457, 0.237232, 0.050692, −0.970130] [100.09, 30.42, 475.85] 1280,720 60
D0 autostereoscopic [1.0, 0.0, 0.0, 0.0, 1.0, 0.0, 0.0, 0.0, 1.0] [0.0, 0.0, 0.0] 24 1920,1080 60 1 1.5 30 30

In another embodiment of the present invention, 8 cameras (with positions respectively being P0 to P7) are adopted to form a camera array for the 3D video capturing, and three 50 inch multiview displays each with 8 viewpoints (with positions respectively being left, middle, and right) are adopted for presence. An optimum viewing distance is 2.5 m, view angle range is 1 m, and a maximum parallax is 50 pixels. A 3D video capability is shown in Table 5.

TABLE 5

C0 video P0 1920,1080 60
C1 video P1 1920,1080 60
. . .
C7 video P7 1920,1080 60
D0 multiview left 50 1280,720 60 8 2.5 100 50
D1 multiview center 50 1280,720 60 8 2.5 100 50
D2 multiview right 50 1280,720 60 8 2.5 100 50

302: The receiver sends a 3D capability information parameter to a sender through a signaling message.

303: The sender receives the 3D capability information parameter.

304: The sender learns a 3D capability (for example, the supported number of 3D video streams, an encoding manner, and the like) of the receiver through the received 3D capability information parameter, performs 3D capability adaptation on a local 3D capability, and then seeks confirmation from the receiver. For example, a 3D capability of a capturing end of the sender is adapted to a 3D capability of a local displaying end, and a 3D capability of a displaying end of the sender is adapted to a 3D capability of a local capturing end.

305: The sender performs video encoding and sending according to a situation of the adaptation.

306: The receiver receives 3D video streams sent by a sending end.

307: The receiver decodes and renders the 3D video streams for displaying.

In the foregoing negotiation procedure, during interaction of the 3D video capability information parameter, description of a feature of a 3D video stream may also be included, for example, whether a data stream is a 3D video stream, data content of the 3D video stream (for example, whether it is 2D video data or depth/parallax data), an encoding manner of the 3D video stream (for example, whether it is encoded in a spatial packaging manner or encoded in a scalable resolution enhancement frame compatible stereo manner, and the like), and other parameters of the 3D video stream (including a resolution, frame rate, required bandwidth, and the like); and correspondence between a video stream and a capturing end camera described in the 3D capability information and correspondence between a video stream and a displaying device for presence, and the like, may be established.

In an embodiment of the present invention, in a 3D video formed by 2 presentation video streams on the left and right, V0 and V1 are both 2D video streams, respectively correspond to cameras C0 and C1, and form a stereo video stream through a set set1 to be presented on a display D0. V0 and V1 are encoded by adopting H.264/Advanced Video Coding (AVC). A resolution is 1920×1080, a frame rate is 60 frames, and an occupied bandwidth is 4 megbaits per second (Mbps). Then, in this embodiment, 3D video stream information is described in Table 6.

TABLE 6

V0 presentation stereo C0 D0 AVC 1920,1080 60 4
V1 presentation stereo C1 D0 AVC 1920,1080 60 4
set1 {V0, V1}

In a certain embodiment of the present invention, 1 channel of 3D video stream V0 formed by 2D videos of two object cameras C0 and C1 on the left and right is presented on a display D0. Encoding is performed in a Side-By-Side spatial packaging manner, and a format is H.264/AVC. A resolution is 1920×1080, a frame rate is 60 frames, and an occupied bandwidth is 4 M. Then, in this embodiment, 3D video stream information is described in Table 7.

TABLE 7

V0 object stereo (C0, C1) D0 side-by-side AVC 1920,1080 60 4

In a certain embodiment of the present invention, 1 channel of 3D video stream V0 formed by 2D videos of 3 object cameras C0, C1, and C2 is presented on a display D0. Encoding is performed in a multiview video coding (MVC) manner. A resolution is 1920×1080, a frame rate is 30 frames, and an occupied bandwidth is 8 M. Then, in this embodiment, 3D video stream information is described in Table 8.

TABLE 8

V0 object multiview (C0, C1, C2) D0 MVC 1920,1080 30 8

There may be multiple results after the capability negotiation is performed in the manners described in the foregoing two embodiments. According to a situation of adaptation, two parties may adopt multiple manners to perform a subsequent encoding and decoding procedure, which is described briefly in the following.

1. A simplest situation is that, the two parties are an isomorphic telepresence system, and a remote end may perform decoding and presence on a 3D video stream in a manner of a local end.

2. A receiving end is a telepresence system supporting only a 2D video and cannot present a 3D video, or does not support a 3D video encoding manner of the local end, and therefore, can only decode 2D video data in the 3D video stream and perform 2D presence.

Then, after the adaptation, the two parties may adopt the following manners to perform encoding and decoding: For 3D video data in a manner of multiple video streams, it may be that only one 2D video stream among the video streams is decoded and other video streams are not decoded; for 3D video data in a spatial packaging manner, it may be that after the decoding, one 2D video image is adopted for presence; for 3D video data adopting a scalable resolution enhancement frame compatible stereo manner, a manner that only 2D video data at a basic layer is decoded and data at an enhanced layer is not decoded may be adopted.

3. A telepresence system of the receiving end may also support a 3D video, but a supported presence manner is different from that of the local end. In this case, the system of the receiving end needs to render a 3D video manner according to a local presence manner. For example, images of left and right viewpoints are generated again according to a 3D displaying manner and a maximum parallax presence capability of a local displaying device and according to the 2D video data and parallax/depth images obtained through the decoding.

For a situation of a multi-point conference, a multipoint control unit (MCU) is needed to perform switch of 2D/3D video encoding. For a terminal not supporting a 3D video, video transcoding from 3D to 2D may be performed by the MCU. For different 3D video encoding formats, transcoding may also be performed by the MCU to adapt to a telepresence system that supports different 3D video encoding and decoding formats. For example, a sending end may send 3D video data in a spatial packaging manner, but the receiving end can only receive 3D video data in a scalable resolution enhancement frame compatible stereo manner, and therefore, the MCU performs conversion between the two encoding formats.

Figure 4:
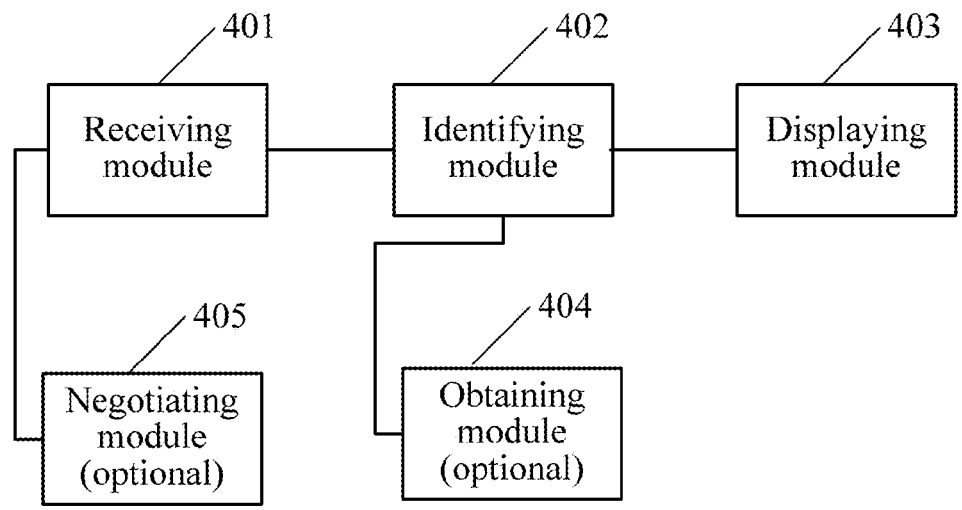
FIG. 4 is a specific schematic composition diagram of a video presence system according to an embodiment of the present invention.

Accordingly, as shown in FIG. 4, an embodiment of the present invention further provides a video presence system, where the system includes the following modules: a receiving module 401 configured to receive a multi-viewpoint three-dimensional video signal from a remote end; a identifying module 402 configured to identify multiple viewpoint image streams in the multi-viewpoint three-dimensional video signal; and a displaying module 403 configured to alternately display the multiple viewpoint image streams in sequence in a viewing area, where a distance between two neighboring viewpoints in the multiple viewpoint image streams displayed in the viewing area is a pupillary distance.

The receiving module 401 is further configured to receive multiple multi-viewpoint three-dimensional video signals from the remote end. The system includes multiple displaying modules 3, respectively displaying multiple viewpoint image streams determined according to the multiple multi-viewpoint three-dimensional video signals.

At the same time, the system may further include: an obtaining module 404 configured to obtain viewing area information. Then, the identifying module 402 is further configured to identify the multiple viewpoint image streams in the multi-viewpoint three-dimensional video signal according to the viewing area information.

The system may further include: a negotiating module 405 configured to perform three-dimensional video capability negotiation with the remote end, and determine three-dimensional video capability information and/or three-dimensional video stream information, so that the receiving module receives the multi-viewpoint three-dimensional video signal from the remote end according to the determined three-dimensional video capability information and/or three-dimensional video stream information.

The three-dimensional video capability information and/or the three-dimensional video stream information include a three-dimensional video capturing end parameter and a three-dimensional video displaying end parameter.

The three-dimensional video displaying end parameter includes one or more of the number of three-dimensional video displaying devices, a three-dimensional video displaying device type, the number of viewpoints, an ideal viewing distance, and a maximum displaying parallax; and the three-dimensional video capturing end parameter includes one or more of the number of three-dimensional video capturing devices, a three-dimensional video capturing device type, and a three-dimensional video capturing device spatial position relationship.

Figure 5:
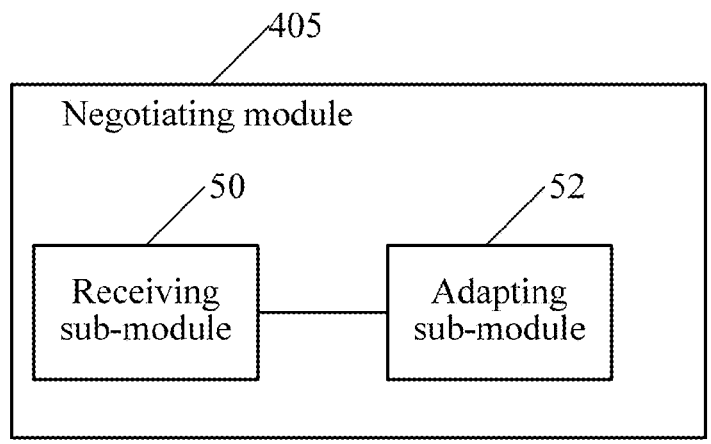
FIG. 5 is a specific schematic composition diagram of a negotiating module according to an embodiment of the present invention.

As shown in FIG. 5, the negotiating module 405 may include: a receiving sub-module configured to receive three-dimensional video capability information and/or three-dimensional video stream information sent by the remote end; and an adapting sub-module 52 configured to perform three-dimensional video capability adaptation according to the three-dimensional video capability information and/or the three-dimensional video stream information to obtain the locally supported three-dimensional video capability information and/or the locally supported three-dimensional video stream information.

Figure 6:
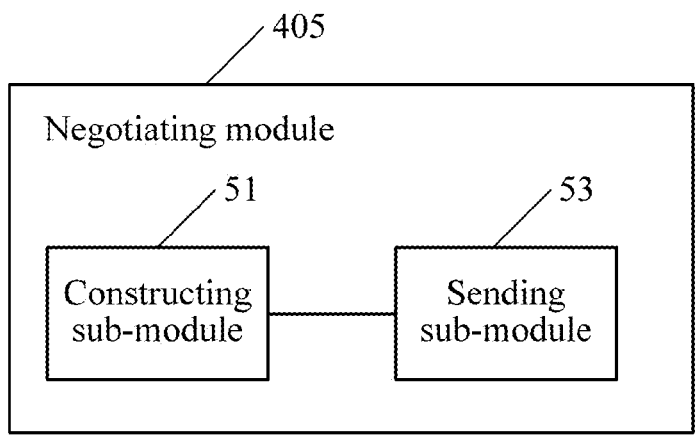
FIG. 6 is another specific schematic composition diagram of a negotiating module according to an embodiment of the present invention.

Alternatively, as shown in FIG. 6, the negotiating module 405 may include: a constructing sub-module 51 configured to construct three-dimensional video capability information and/or the three-dimensional video stream information; and a sending sub-module 53 configured to send the three-dimensional video capability information and/or the three-dimensional video stream information to the remote end, so that the remote end performs three-dimensional video capability adaptation, and then sends a three-dimensional video signal according to the three-dimensional video capability information and/or the three-dimensional video stream information.

Explanation of each term in the system embodiment is consistent with that in the foregoing method embodiment, and is not repeatedly described one by one herein.

The following further describes, by using several different system layouts, a case in which multi-viewpoint 3D displaying is performed according to a viewing position.

Figure 7:
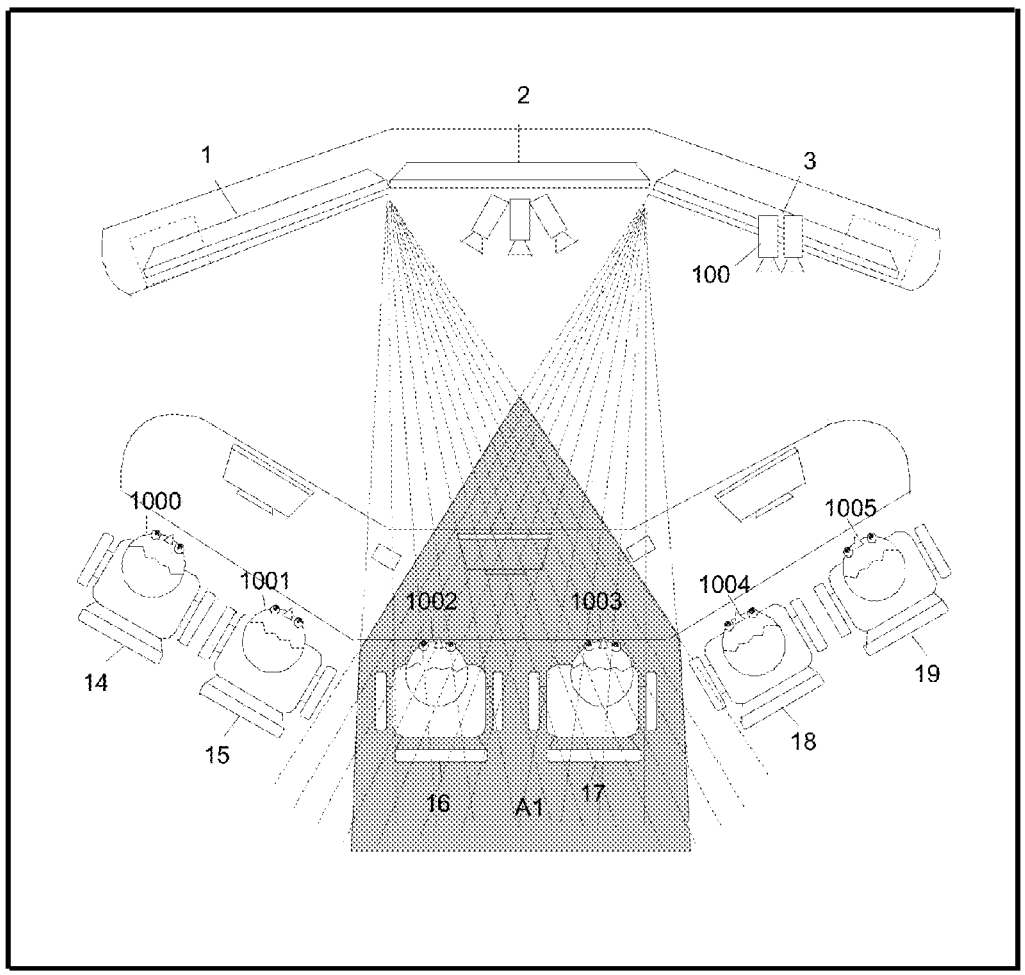
FIG. 7 is a specific schematic composition diagram of a telepresence system layout 1 according to an embodiment of the present invention.

As shown in FIG. 7, in a layout of this embodiment, a display 2 in the middle is a multi-viewpoint naked eye 3D display (on which 2D/3D displaying switch may be performed), and displays 1 and 3 beside the display 2 are common 2D displays. Viewing view angle range A1 (a shadow area in the drawing) of the display 2 just cover two seats 16 and 17 in the middle, and an optimum viewing distance is a vertical distance from a surface of a displaying screen to the seats 16 and 17. According to the foregoing displaying principle of the multi-viewpoint naked eye 3D display, images of multiple viewpoints appear alternately in sequence in a viewing area (a part covered by dashed lines in the drawing), and a distance between two neighboring viewing viewpoints is a pupillary distance. Therefore, left and right eyes of users 1002 and 1003 can see images of two viewpoints at the same time, so that a stereo (that is 3D) visual sense is formed. Because the viewing viewpoint range covers an A1 area, all users in this area can see a 3D video. However, when viewing displays 1 and 3, the users can see only a 2D video. This layout does not have a high requirement for a viewing view angle of a multi-viewpoint 3D display, and the viewing view angle range only needs to cover a relatively small area.

In a procedure of capability negotiation with a remote system, the foregoing local features are notified, and then an appropriate multi-viewpoint 3D video stream is obtained and rendered. In the system of this embodiment, the display 2 has a function of the displaying module in the embodiment, but functions of the receiving module and the identifying module in the embodiment may be integrated in the display 2 (in this case, it is required that the display 2 should have a corresponding processing capability), and may also be implemented independently by a processor with a processing capability; similarly, functions of the negotiating module and the obtaining module may also have similar setting. The system in each embodiment in the following is also similar, and is not repeatedly described herein.

Figure 8:
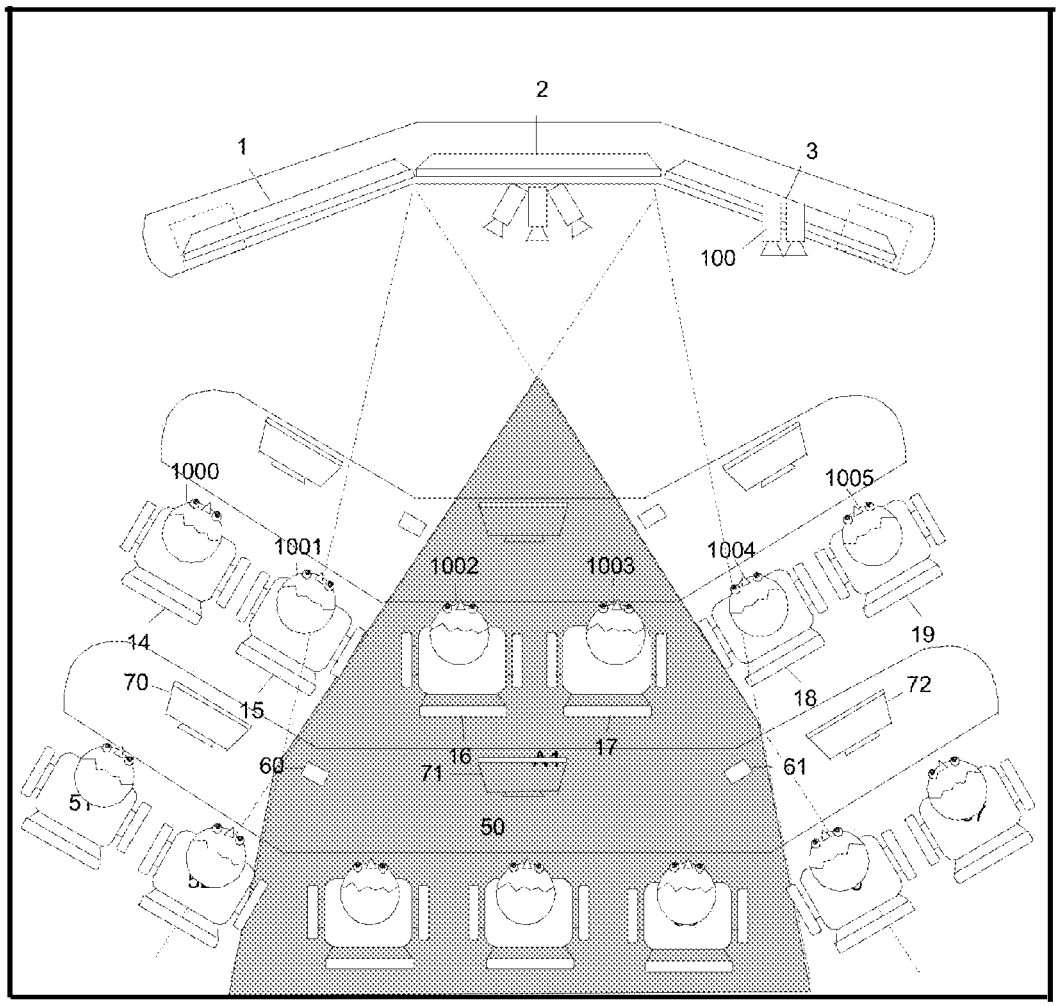
FIG. 8 is another specific schematic composition diagram of a telepresence system layout 1 according to an embodiment of the present invention.

As shown in FIG. 8, a multi-row implementation manner based on the layout of FIG. 7 is displayed, which is similar to a single-row manner (a 3D imaging principle is similar to that in FIG. 7, and for simplifying the drawing, the dashed line viewpoint part is no longer drawn herein).

Figure 9:
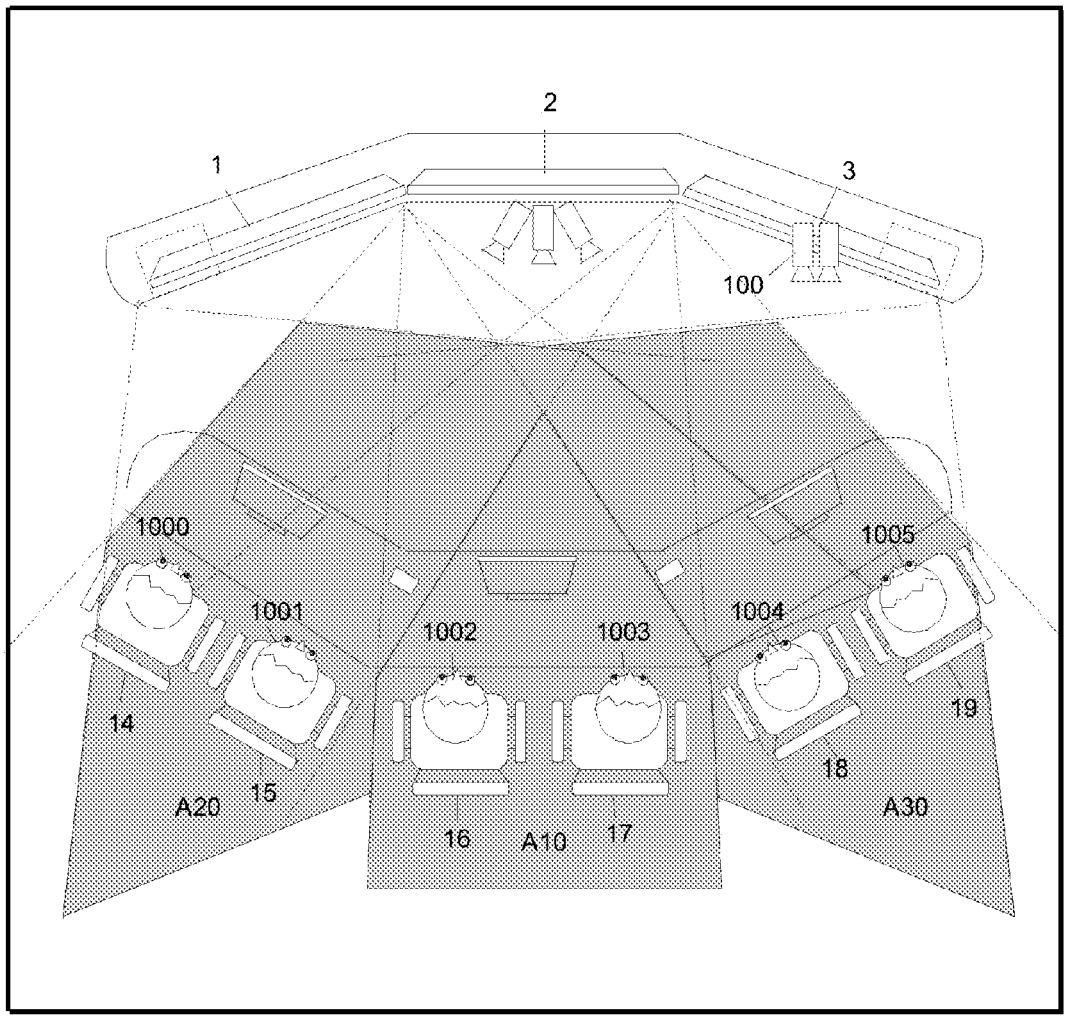
FIG. 9 is a specific schematic composition diagram of a telepresence system layout 2 according to an embodiment of the present invention.

As shown in FIG. 9, it is a system layout 2 in the embodiment of the present invention (a 3D imaging principle is similar to that of the layout in FIG. 7, and for simplifying the drawing, the dashed line viewpoint part is no longer drawn herein). In this layout, displays 1, 2, and 3 are all multi-viewpoint naked eye 3D displays (on which 2D/3D displaying switch may be performed). Viewing view angle range A10 of the display 2 covers seats 16 and 17 in the middle, viewing view angle range A20 of the display 1 covers seats 14 and 15, and viewing view angle range A30 of the display 3 covers seats 18 and 19. In this layout, a person in each seat can obtain ideal 3D experience when viewing a nearest display. The seats 16 and 17 in the middle can generally obtain ideal 3D experience when viewing the displays 1 and 3. However, all other seats may not obtain 3D experience when viewing each display. It may be seen that, the viewing view angle range of the 3 displays is different. The range for the display in the middle is small, and the range for the displays on both sides is large. Therefore, different manufacturing processes need to be adopted for the display in the middle and the displays on both sides to ensure that the viewing view angle range is different. The principle of the multi-row manner is similar to that of the single-row, and is not repeatedly described herein.

Figure 10:
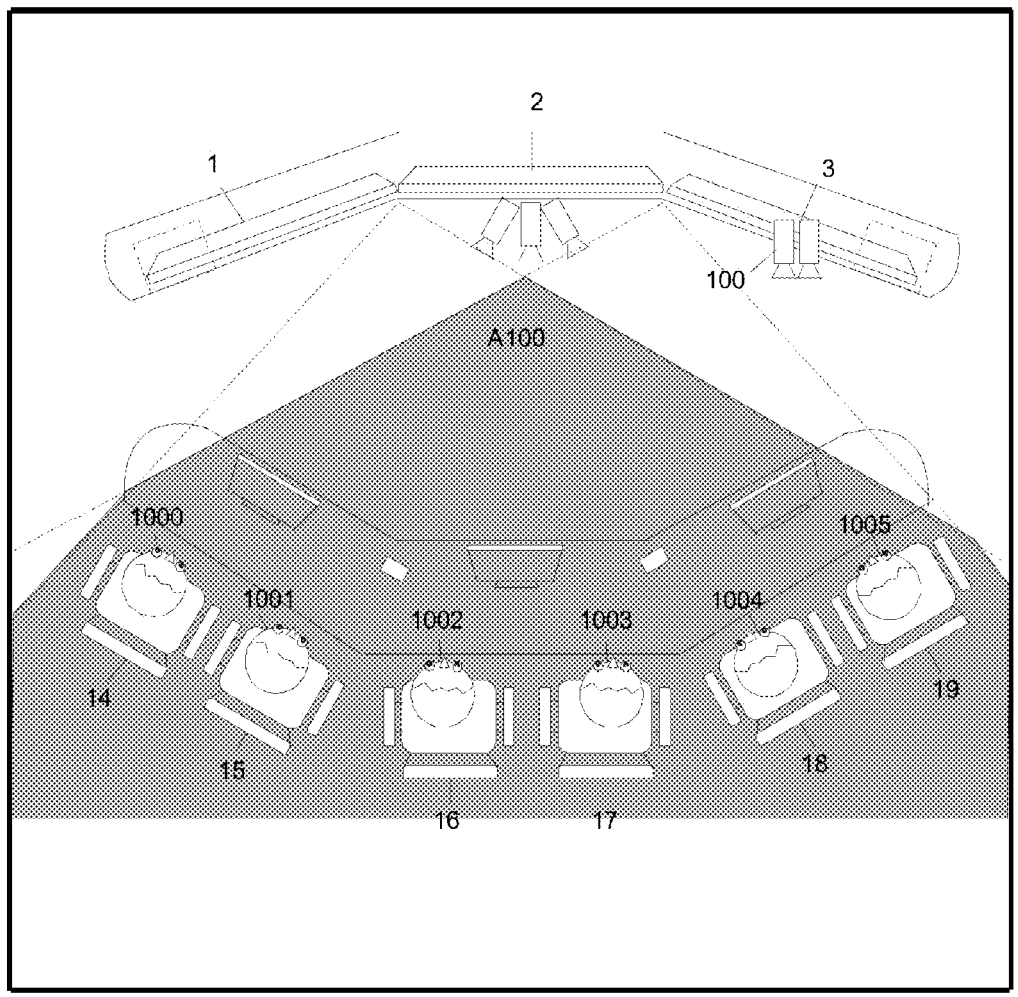
FIG. 10 is a specific schematic composition diagram of a telepresence system layout 3 (one part) according to an embodiment of the present invention.
Figure 11:
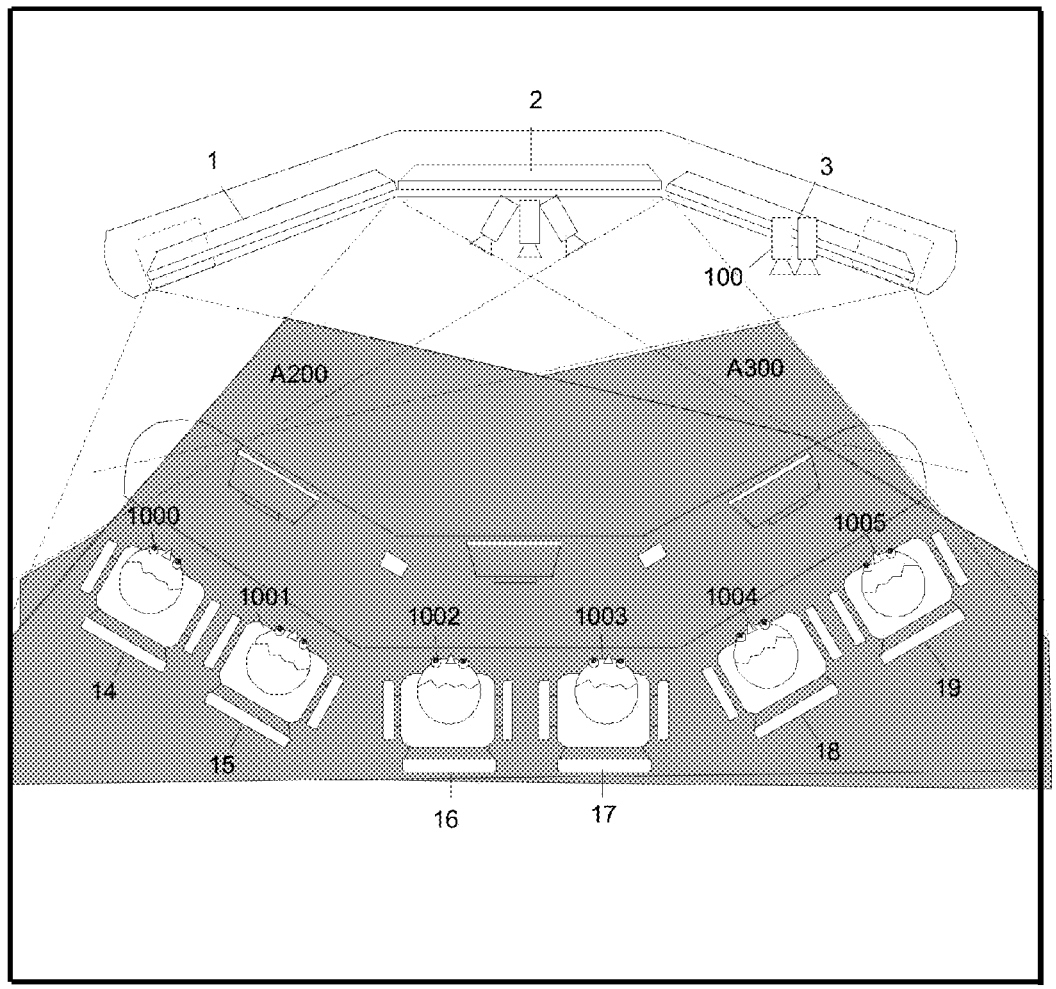
FIG. 11 is a specific schematic composition diagram of the telepresence system layout 3 (the other part) according to an embodiment of the present invention.

As shown in FIG. 10 and FIG. 11, it is a design layout 3 of multi-viewpoint 3D presence in a telepresence system in the embodiment of the present invention (a 3D imaging principle is similar to that of the layout 1, and for simplifying the drawing, the dashed line viewpoint part is no longer drawn herein). In this layout, displays 1, 2, and 3 are all multi-viewpoint naked eye 3D displays (on which 2D/3D displaying switch may be performed), their viewing view angle range A100, A200, and A300 each covers an entire user area. Under this layout, each user can obtain optimum 3D experience when viewing 3 displays. A viewing view angle of each display is relevant to a relative position relationship between the display and a user seat. Therefore, the viewing view angle range may be different, and different manufacturing processes need to be adopted. The principle of the multi-row manner is similar to that of the single-row, and is not repeatedly described herein.

Figure 12:
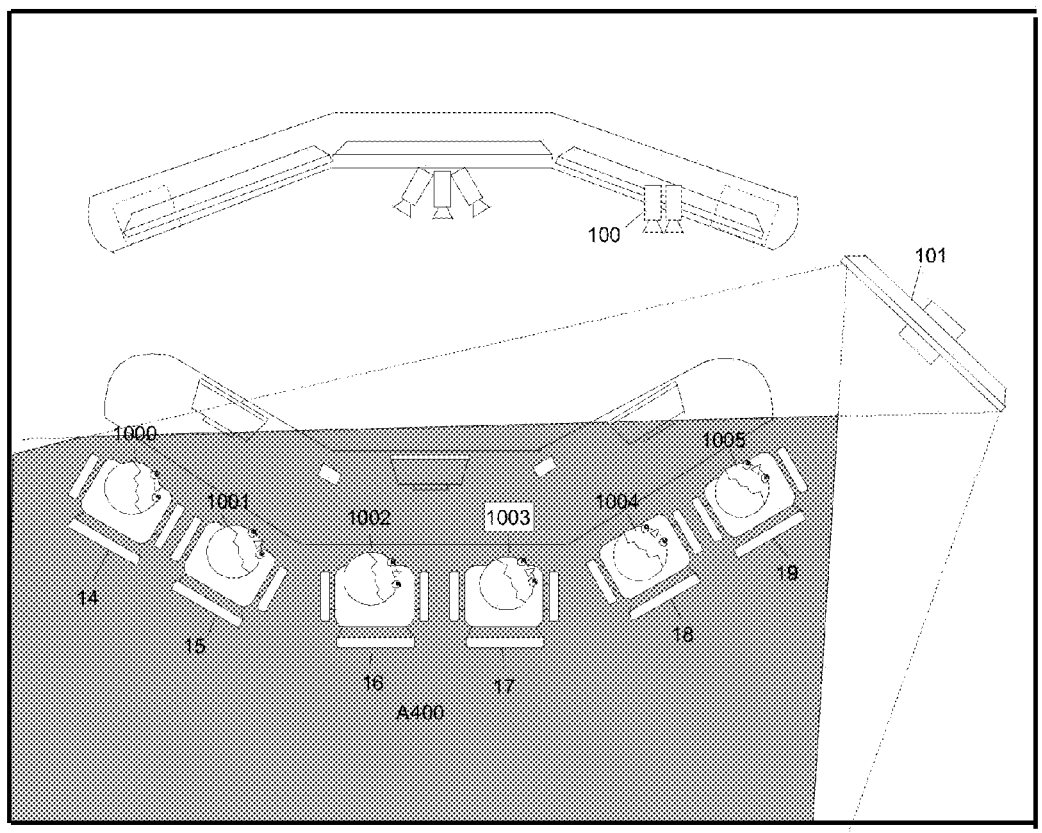
FIG. 12 is a specific schematic composition diagram of a telepresence system layout 4 according to an embodiment of the present invention.

As shown in FIG. 12, it is a design layout 4 of multi-viewpoint 3D presence in a telepresence system in the embodiment of the present invention (a 3D imaging principle is similar to that of the layout 1, and for simplifying the drawing, the dashed line viewpoint part is no longer drawn herein). In this layout, an independent multi-viewpoint 3D display 101 placed on a side surface is adopted to provide 3D presence. Therefore, during display design, viewing view angle range A400 needs to be enabled to cover an entire user seat area. The principle of the multi-row manner is similar to that of the single-row, and is not repeatedly described herein.

Figure 13:
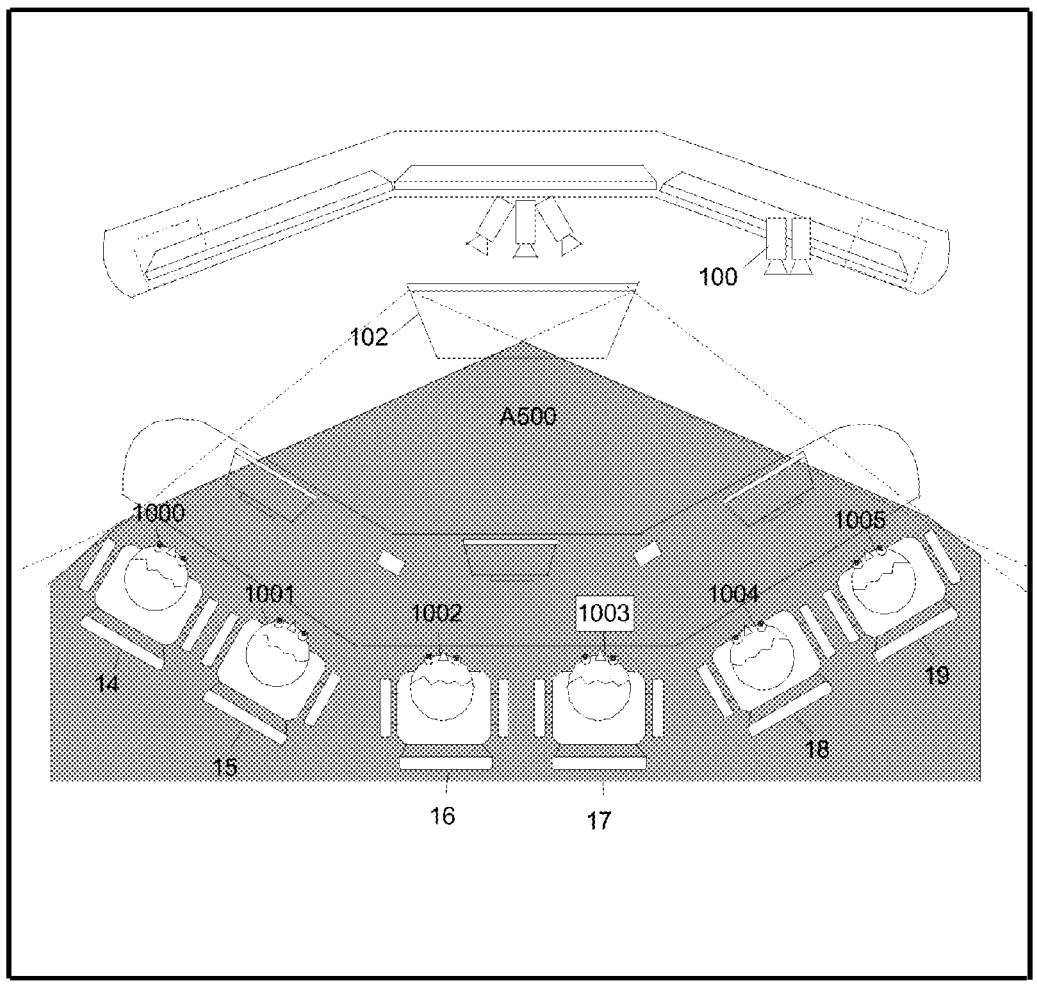
FIG. 13 is a specific schematic composition diagram of a telepresence system layout 5 according to an embodiment of the present invention.

As shown in FIG. 13, it is a design layout 5 of multi-viewpoint 3D presence in a telepresence system in the embodiment of the present invention (a 3D imaging principle is similar to that of the layout 1, and for simplifying the drawing, the dashed line viewpoint part is no longer drawn herein). In this layout, an independent multi-viewpoint 3D display 102 placed below a display in the middle is adopted to provide 3D presence. Viewing view angle range A500 must also cover an entire user seat area to obtain optimum 3D experience. The principle of the multi-row manner is similar to that of the single-row, and is not repeatedly described herein.

Figure 14:
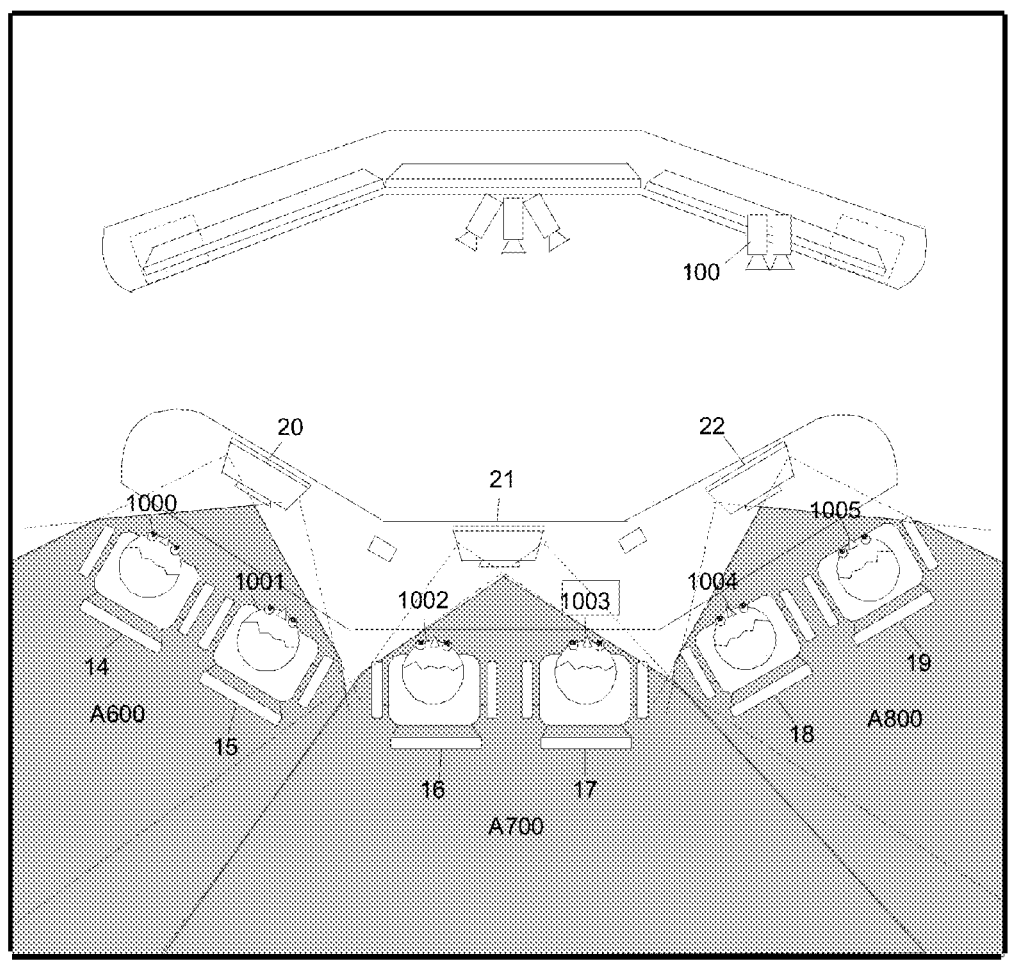
FIG. 14 is a specific schematic composition diagram of a telepresence system layout 6 according to an embodiment of the present invention.

As shown in FIG. 14, it is a design layout 6 of multi-viewpoint 3D presence in a telepresence system in the embodiment of the present invention (a 3D imaging principle is similar to that of the layout 1, and for simplifying the drawing, the dashed line viewpoint part is no longer drawn herein). In the layout, auxiliary displays 20, 21, and 22 are displays that support 2D/3D displaying. 3D viewing view angle range A600 covers seats 14 and 15, viewing view angle range A700 covers seats 16 and 17, and viewing view angle range A800 covers seats 18 and 19. In this way, a user in each seat area can see a 3D video of an auxiliary display in this area, and obtains an optimum viewing effect. The principle of the multi-row manner is similar to that of the single-row, and is not repeatedly described herein.

In the video presence system of the embodiments of the present invention, a three-dimensional video technology is adopted, a multi-viewpoint three-dimensional video signal adapted to a telepresence system is selected according to a characteristic of the three-dimensional video signal, and the three-dimensional video signal is displayed according to a viewing area, which ensures that a viewer using the system may effectively view a video with a three-dimensional effect, and implements a remote three-dimensional video presence system.

Also, the embodiments of the present invention further provide a specific solution for performing 3D video information negotiation in a remote system, thereby implementing effective coordination when two ends with different 3D video capabilities form a remote system.

A person of ordinary skill in the art should understand that, all or a part of processes in the method according to the foregoing embodiments may be accomplished by a computer program instructing relevant hardware. The program may be stored in a computer-readable storage medium. When the program is executed, the process of the method according to the foregoing embodiments is performed. The storage medium may be a magnetic disk, an optical disk, a read only memory (ROM), a random access memory (RAM), and the like.

The foregoing disclosure is merely an exemplary embodiment of the present invention, and certainly is not intended to limit the scope of the claims of the present invention. Equivalent modifications made according to the claims of the present invention shall fall within the scope of the present invention.

What is claimed is:

1. A video presence method, comprising:
   receiving a three-dimensional (3D) description information sent by a remote end,
      wherein the 3D description information describes a 3D video capability of the remote end;
   performing 3D video capability adaptation based upon the 3D video capability of the remote end and a local 3D video capability to obtain a locally supported 3D description information,
      wherein the locally supported 3D description information includes a 3D video capturing end parameter and a 3D video displaying end parameter,
      wherein the 3D video displaying end parameter includes at least one of a number of 3D video displaying devices, a 3D video displaying device type, a number of viewpoints, an ideal viewing distance, and a maximum displaying parallax, and
      wherein the 3D video capturing end parameter includes at least one of a number of 3D video capturing devices, a 3D video capturing device type, and a 3D video capturing device spatial position relationship;
   receiving a multi-viewpoint 3D video signal from the remote end;
   identifying multiple viewpoint image streams in the multi-viewpoint 3D video signal based upon the locally supported 3D description information; and displaying alternately the multiple viewpoint image streams in sequence in a viewing area, wherein the multiple viewpoint image streams include a plurality of viewpoints, wherein a distance between each two neighboring viewpoints is equivalent to a preset pupillary distance.

2. The method according to claim 1, wherein the locally supported 3D description information comprises 3D video capability information.

3. The method according to claim 1, wherein the locally supported 3D description information comprises 3D video stream information.

4. The method according to claim 2, wherein the 3D video capability information is described by adopting an abstract syntax notation (ASN.1), an extensible markup language (XML), or a text format.

5. The method according to claim 3, wherein the 3D video stream information comprises one or more of whether a data stream is a 3D video stream, a data content of the 3D video stream, an encoding manner, a resolution, a frame rate, and a bandwidth of the 3D video stream.

6. A video presence system, comprising:
a processor; and
a computer readable storage medium storing computer executable instructions, wherein the processor is configured to execute the computer executable instructions to:
  receive a three-dimensional (3D) description information sent by a remote end,
    wherein the 3D description information describes a 3D video capability of the remote end;
  perform 3D video capability adaptation based upon the 3D video capability of the remote end and a local 3D video capability to obtain a locally supported 3D description information,
    wherein the locally supported 3D description information includes a 3D video capturing end parameter and a 3D video displaying end parameter,
    wherein the 3D video displaying end parameter includes at least one of a number of 3D video displaying devices, a 3D video displaying device type, a number of viewpoints, an ideal viewing distance, and a maximum displaying parallax, and
    wherein the 3D video capturing end parameter includes at least one of a number of 3D video capturing devices, a 3D video capturing device type, and a 3D video capturing device spatial position relationship;
  receive a multi-viewpoint 3D video signal from a remote end;
  identify multiple viewpoint image streams in the multi-viewpoint 3D video signal based upon the locally supported 3D description information; and
  alternately display the multiple viewpoint image streams in sequence in a viewing area,
    wherein a distance between two neighboring viewpoints in the multiple viewpoint image streams displayed in the viewing area is a pupillary distance.

7. The system according to claim 6, wherein the processor is further configured to:
obtain viewing area information; and
determine the multiple viewpoint image streams in the multi-viewpoint 3D video signal according to the viewing area information.

8. The system according to claim 6, wherein the 3D description information comprises 3D video capability information.

9. The system according to claim 6, wherein the 3D description information comprises 3D video stream information.

10. A video presence system, comprising:
an interface for communicating with a remote end; and
a processor coupled to the interface and configured to:
  receive a three-dimensional (3D) description information sent by a remote end,
    wherein the 3D description information describes a 3D video capability of the remote end;
  perform 3D video capability adaptation based upon the 3D video capability of the remote end and a local 3D video capability to obtain a locally supported 3D description information,
    wherein the locally supported 3D description information includes a 3D video capturing end parameter and a 3D video displaying end parameter,
    wherein the 3D video displaying end parameter includes at least one of a number of 3D video displaying devices, a 3D video displaying device type, a number of viewpoints, an ideal viewing distance, and a maximum displaying parallax, and
    wherein the 3D video capturing end parameter includes at least one of a number of 3D video capturing devices, a 3D video capturing device type, and a 3D video capturing device spatial position relationship;
  receive a multi-viewpoint 3D video signal from the remote end;
  identify multiple viewpoint image streams in the multi-viewpoint 3D video signal based upon the locally supported 3D description information; and
  display alternately the multiple viewpoint image streams in sequence in a viewing area,
    wherein the multiple viewpoint image streams include a plurality of viewpoints, and wherein a distance between each two neighboring viewpoints is equivalent to a preset pupillary distance.

11. The system according to claim 10, wherein the processor is further configured to obtain viewing area information, and wherein the processor is configured to identify the multiple viewpoint image streams in the multi-viewpoint 3D video signal according to the viewing area information.

12. The system according to claim 10, wherein the locally supported 3D description information comprises 3D video capability information.

13. The system according to claim 10, wherein the locally supported 3D description information comprises 3D video stream information.

14. The method according to claim 1, wherein the method further comprises obtaining viewing area information, and wherein identifying the multiple viewpoint image streams in the multi-viewpoint 3D video signal comprises identifying the multiple viewpoint image streams in the multi-viewpoint 3D video signal according to the viewing area information.

* * * * *